US009897258B2

(12) United States Patent
Imboccioli et al.

(10) Patent No.: US 9,897,258 B2
(45) Date of Patent: Feb. 20, 2018

(54) GAS PRESSURE REGULATOR AND METHOD FOR PILOTING SAID PRESSURE REGULATOR

(71) Applicant: PIETRO FIORENTINI SPA, Arcugnano (VI) (IT)

(72) Inventors: Claudio Imboccioli, Creazzo (IT); Michele Bernardi, Selvazzano Dentro (IT)

(73) Assignee: Pietro Fiorentini SPA, Arcugnano (VI) (IT)

( * ) Notice: Subject to any disclaimer, the term of this patent is extended or adjusted under 35 U.S.C. 154(b) by 22 days.

(21) Appl. No.: 14/890,874

(22) PCT Filed: May 14, 2014

(86) PCT No.: PCT/IB2014/000748
§ 371 (c)(1),
(2) Date: Nov. 12, 2015

(87) PCT Pub. No.: WO2014/184647
PCT Pub. Date: Nov. 20, 2014

(65) Prior Publication Data
US 2016/0102811 A1 Apr. 14, 2016

(30) Foreign Application Priority Data
May 17, 2013 (IT) .............................. VI2013A0136

(51) Int. Cl.
*F16K 31/12* (2006.01)
*F17D 3/01* (2006.01)
(Continued)

(52) U.S. Cl.
CPC ................ *F17D 3/01* (2013.01); *F16K 31/12* (2013.01); *F17D 1/04* (2013.01); *G05D 16/163* (2013.01)

(58) Field of Classification Search
CPC .. F17D 3/01; F17D 1/04; F16K 31/12; G05D 16/163; Y01T 137/7762; Y01T 137/7764;
(Continued)

(56) References Cited

U.S. PATENT DOCUMENTS 2,042,781 A 6/1936 Grove
2,277,162 A 3/1942 Soderberg
(Continued)

OTHER PUBLICATIONS

International Search Report and Written Opinion dated Sep. 12, 2014, issued in PCT Application No. PCT/IB2014/000748, filed May 14, 2014.

*Primary Examiner* — Minh Le
(74) *Attorney, Agent, or Firm* — Workman Nydegger

(57) ABSTRACT

A method for piloting a pressure regulator for an operative gas, the pressure regulator having a flow duct for the operative gas; a shutter causing a pressure drop in the operative gas, from a feeding pressure to a delivery pressure; a motorisation chamber delimited by a first movable wall associated with the shutter so that an increase in the delivery pressure causes a narrowing of the shutter; an elastic element exerting on a first movable wall a force directed to counteract the pressure force exerted by the operative gas on the first movable wall and widening the shutter; a compensation chamber housing a compensation gas and at least partially delimited by a second movable wall connected to the shutter to enable transferring on it the pressure force of the compensation gas, the method including the operation of regulating, moment by moment, the pressure of the compensation gas as a function of the delivery pressure.

11 Claims, 2 Drawing Sheets

(51) Int. Cl.
*G05D 16/16* (2006.01)
*F17D 1/04* (2006.01)

(58) Field of Classification Search
CPC ......... Y01T 137/7768; Y01T 137/7781; Y01T 137/7782; Y01T 137/7793; Y01T 137/7797; Y01T 137/7801; Y01T 137/7822; Y01T 137/782
USPC ............ 137/488, 489, 489.5, 494, 495, 505, 137/505.14, 505.18, 505.38, 505.36
See application file for complete search history.

(56) References Cited

U.S. PATENT DOCUMENTS

| | | | | |
|---|---|---|---|---|
| 2,637,946 A * | 5/1953 | Parks | ................... | G05D 16/163 137/489.5 |
| 2,825,361 A | 3/1958 | Seljos | | |
| 3,020,925 A * | 2/1962 | Randall | ................ | F16K 31/365 137/489.5 |
| 3,774,628 A * | 11/1973 | Norton | ................... | F16K 17/085 137/115.15 |
| 3,807,427 A * | 4/1974 | Hogel | ................ | G05D 16/0655 137/115.26 |
| 4,188,971 A * | 2/1980 | Otteson | ................... | F16K 17/34 137/460 |
| 6,371,156 B1 * | 4/2002 | Walton | ................. | G05D 16/166 137/106 |
| 7,192,665 B2 * | 3/2007 | Nakajima | ............ | F16K 17/196 123/463 |
| 7,318,447 B2 * | 1/2008 | Law | .................... | G05D 16/2093 137/14 |
| 7,418,973 B2 * | 9/2008 | Graham | ............ | G05D 16/0663 137/15.19 |
| 8,091,582 B2 * | 1/2012 | Folk | ...................... | F16K 31/365 137/489 |
| 8,136,545 B2 * | 3/2012 | Jablonski | ............ | G05D 16/163 137/492 |
| 8,276,612 B2 * | 10/2012 | Folk | ...................... | F16K 31/365 137/489 |
| 8,474,786 B2 * | 7/2013 | Schneider | ............... | F16K 1/487 137/494 |
| 9,104,208 B2 * | 8/2015 | Vasquez | ................... | F16K 24/04 |
| 2011/0162730 A1 * | 7/2011 | Gotthelf | ............ | G05D 16/0666 137/505 |
| 2013/0074956 A1 * | 3/2013 | Okitsu | ................. | G05D 16/163 137/505 |
| 2014/0261785 A1 * | 9/2014 | Andersson | ........ | G05D 16/0658 137/505 |
| 2014/0290760 A1 * | 10/2014 | Iitaka | .................... | G05D 16/10 137/505 |
| 2015/0277451 A1 * | 10/2015 | Huo | ..................... | F16K 31/1264 137/505 |

* cited by examiner

GAS PRESSURE REGULATOR AND METHOD FOR PILOTING SAID PRESSURE REGULATOR

BACKGROUND OF THE INVENTION

1. Field of the Invention

The present invention concerns a gas pressure regulator particularly suited to be used in a natural gas distribution network.

The present invention concerns also a method for piloting said pressure regulator.

2. Present State of the Art

As is known, natural gas distribution networks comprise pressure regulation stations, in which the gas pressure is reduced from the feeding value to the delivery value required by the user unit.

Said pressure reduction is obtained by means of pressure regulators that have the function to keep the delivery pressure at a predefined setting value, independently of the flow rate of the delivered natural gas.

A pressure regulator of the known type comprises a natural gas flow duct having one end that communicates with the high-pressure branch of the distribution network and the opposite end that communicates with the low-pressure branch directed towards the user unit.

In the flow duct there is a shutter that defines a narrowing in the flow duct itself, so as to cause a gas pressure drop between the pressure downstream of the shutter and the pressure upstream of the shutter.

The shutter can be moved so that the cross section of the narrowing and, therefore, the gas pressure drop can be modified according to the gas flow rate.

The shutter is moved by means of a feedback circuit that, in the presence of a pressure increase in the delivered gas with respect to the value set in the regulator, reduces the extent of opening of the shutter, and vice versa in the case of a pressure decrease.

Said feedback is based on the use of a motorisation chamber, which is delimited by a movable wall connected to the shutter and associated with a spring.

As long as the pressure in the motorisation chamber is balanced with the force of the spring, the movable wall remains stationary.

In the presence of a pressure perturbation, the movable wall moves until a balanced condition is restored, causing a corresponding movement of the shutter.

According to a first known technique, the motorisation chamber is placed directly in communication with the flow duct in an area downstream of the shutter, so that the movable wall is subjected to the delivery pressure of the natural gas.

The movable wall is connected to the shutter in such a way that a reduction in the delivery pressure following, for example, a flow rate increase, causes the shutter to open so as to restore the initial pressure.

The regulator just described above is called "direct action" regulator, as the movable wall that controls the shutter is directly affected by the delivery pressure of the natural gas.

In this case, the set pressure is regulated by intervening on the spring preload.

Obviously, a direct action regulator responds very quickly to pressure variations, given that the delay is only the delay related to the mechanical inertia of the components of the regulator and to the time necessary for the propagation of the pressure perturbation from the flow duct to the motorization chamber.

On the other hand, said direct action regulator offers a relatively limited regulation precision, deriving from the fact that the force of the spring is not uniform as its deformation varies.

Consequently, the gas pressure that is necessary to balance the force of the spring depends on the deformation of the latter and, therefore, on the position of the movable wall.

Therefore, the delivery pressure of the gas is not constantly equal to the set pressure but departs from the latter according to the position of the shutter. The above mentioned direct action pressure regulator poses the further drawback that it does not allow the set pressure to be modified from a remote position.

In fact, for safety reasons, said setting is carried out by means of an adjusting screw located on the pressure regulator, which modifies the extent of deformation of the spring so as to vary the force it exerts, with the shutter in the same position.

Obviously, the fact that it is not possible to carry out the setting from a remote position leads to the further drawback that said setting must be made on site, with consequently higher labour costs.

A second known technique for controlling the pressure regulator includes an indirect feedback through a pilot device that varies the pressure in the motorisation chamber so that the delivery pressure of the natural gas is kept at the value set in the pilot device.

Prior art regulators operating according to the above second known technique are disclosed in U.S. Pat. Nos. 2,277,162 and in 2,042,781.

Compared to the pressure regulator system previously described, the one just described above offers the advantage that it allows a more precise regulation of the gas delivery pressure.

Still advantageously, the setting of the pilot device can be modified from a remote position, as the setting device has less stringent safety requirements than the pressure regulator.

However, the system just described above poses the drawback that its response time is longer than the response time of the first system, as the latter includes also the reaction times of the pilot device.

A further drawback posed by the system just described above lies in that a malfunction of the pilot device results in the impossibility of regulating the gas delivery pressure, which limits the reliability of the pressure regulator system.

SUMMARY OF THE INVENTION

The present invention intends to overcome all the drawbacks described above that are typical of the pressure regulator systems of the known type.

In particular, it is one object of the present invention to provide a pressure regulator that combines the advantages of a direct action regulator with those offered by a piloted regulator.

More precisely, it is the object of the present invention to provide a pressure regulator that combines the reliability of the regulation performed by a piloted regulator with the quickness of response of a direct action regulator. It is another object of the present invention to provide a pressure regulator that can continue to work as a direct action regulator even in case of fault on the pilot device.

It is a further object of the present invention to provide a pressure regulator that can be easily modified and thus be transformed in a direct action pressure regulator and vice versa.

Said objects are achieved by a method for piloting a pressure regulator according to claim 1.

Said objects are also achieved by a pressure regulator according to claim 6. Further detail characteristics of the invention are described in the corresponding dependent claims.

Advantageously, the fact that a pilot device is used in combination with the pressure regulator makes it possible to modify the setting value of the pressure regulator from a remote position.

BRIEF DESCRIPTION OF THE DRAWINGS

Said objects and advantages, together with others that will be described below, are highlighted in the description of some preferred embodiments of the invention that is provided by way of non-limiting example with reference to the attached drawings, wherein.

DETAILED DESCPITION OF THE PREFERRED ENBODIMENTS

Figure 1:
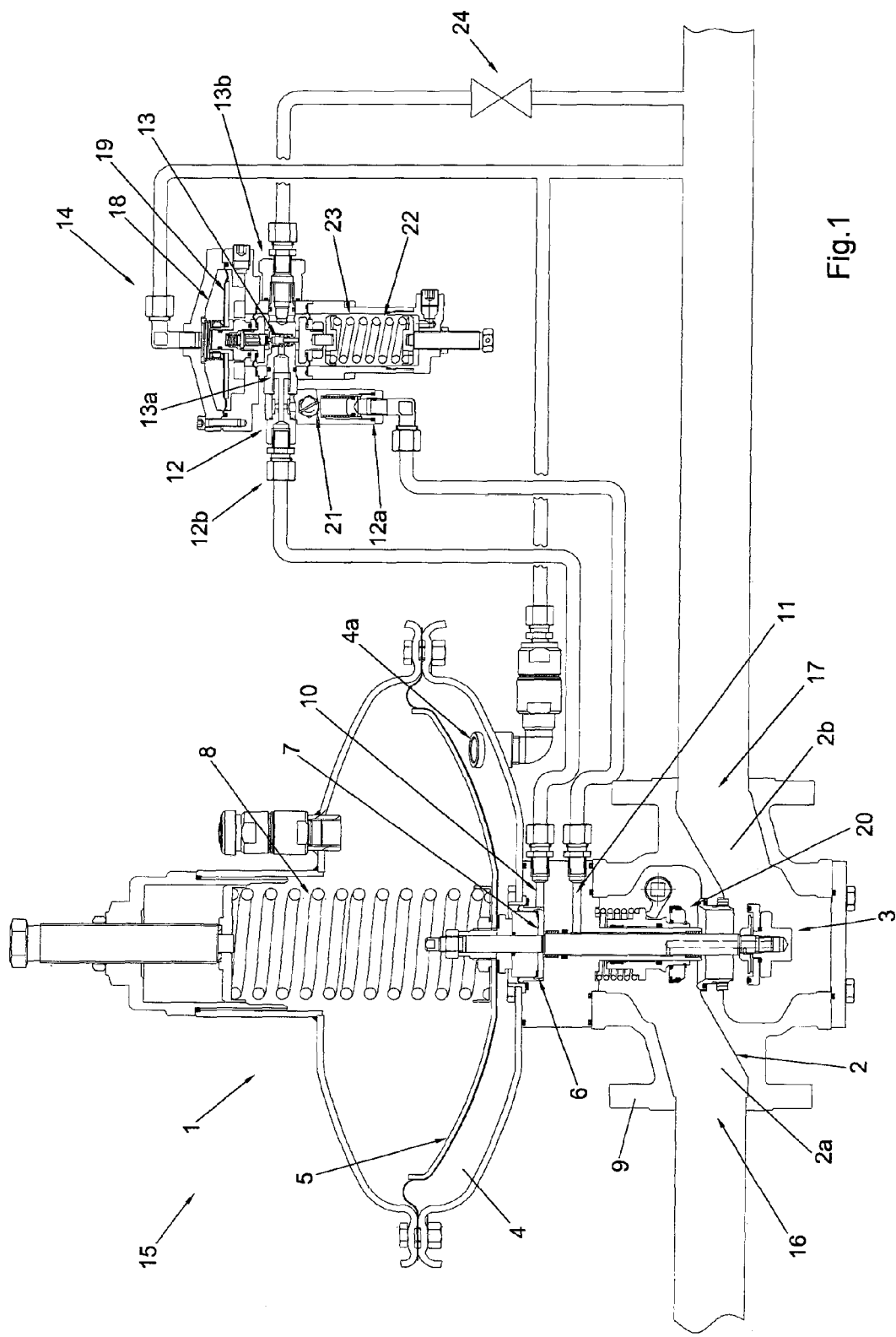
FIG. 1 shows a schematic view of the pressure regulator system that is the subject of the invention.

The pressure regulator system that is the subject of the invention, indicated as a whole by 15 in FIG. 1, is particularly suited to be used in a distribution network of an operative gas, in particular natural gas.

The pressure regulator system 15 is provided with a pressure regulator 1 for said operative gas.

Figure 2:
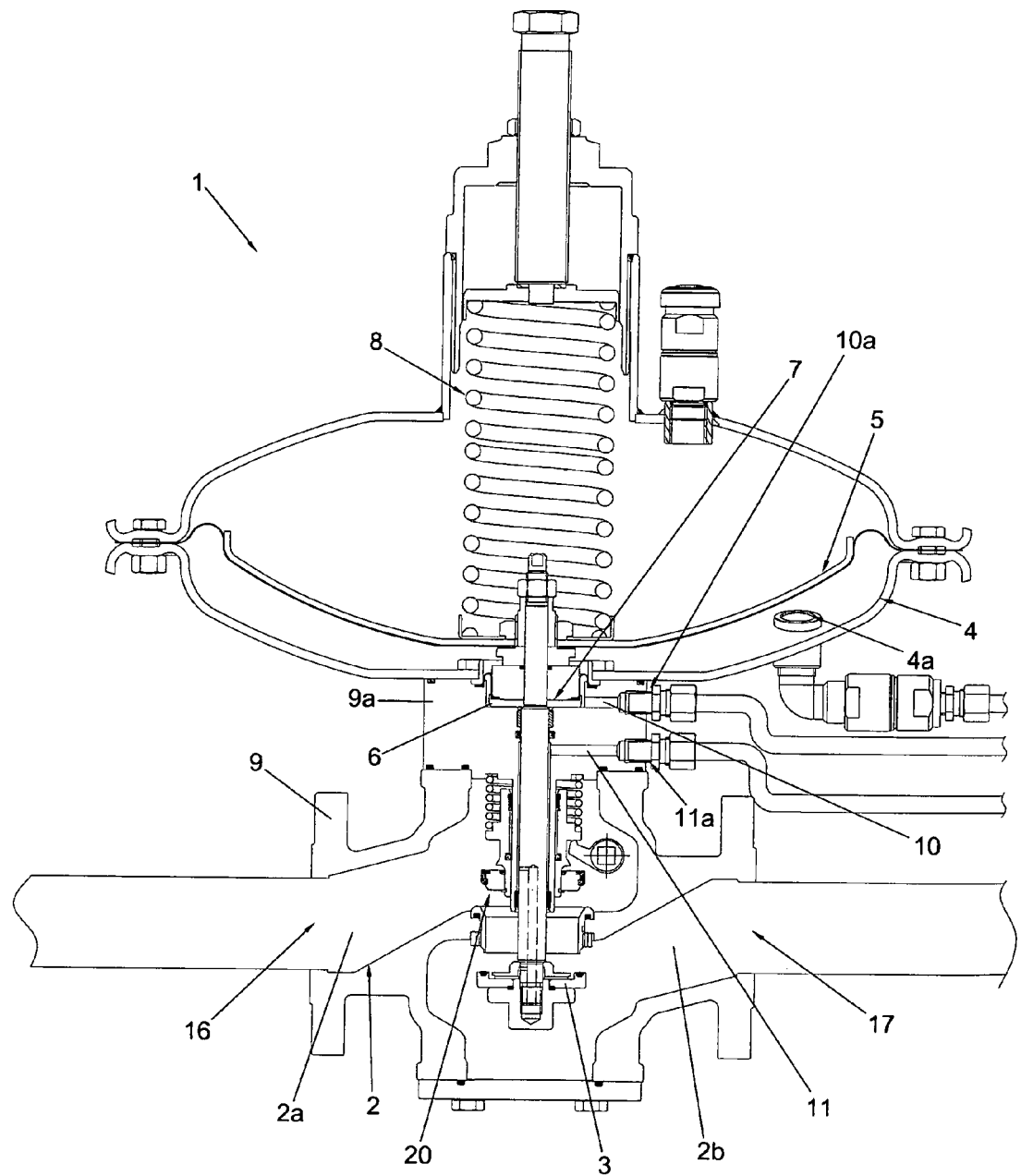
FIG. 2 shows an enlarged detail of FIG. 1.

As shown in greater detail in FIG. 2, the pressure regulator 1 comprises a casing 9 that delimits a flow duct 2 for the operative gas, developing between an inlet mouth 16 and an outlet mouth 17.

The pressure regulator 1 comprises also a shutter 3 arranged along the flow duct 2 in such a way as to define a narrowing in the duct 2 itself, which causes a pressure drop in the operative gas between the feeding pressure in the area 2a upstream of the shutter 3 and the delivery pressure in the area 2b downstream of the same.

In particular, the shutter 3 can be moved in such a way that it is possible to increase or decrease the cross section of said narrowing.

The position of the shutter 3 is adjusted by means of a motorisation chamber 4, which is placed in communication with the downstream area 2b so that the pressure inside it is the delivery pressure.

The motorisation chamber 4 is partially delimited by a first movable wall 5 that, preferably but not necessarily, is an elastically deformable membrane.

Said first movable wall 5 is associated with the shutter 3 in such a way that a delivery pressure increase following, for example, a decrease in the flow rate required by the user unit, causes a corresponding movement of the shutter 3 in such a direction as to cause a reduction in the cross section of the narrowing, and vice versa.

For this purpose, the pressure regulator 1 preferably comprises elastic means 8 configured so that they exert, on the first movable wall 5, a predefined force that counteracts the action of the pressure of the operative gas present in the motorisation chamber 4, so as to balance it at a set pressure value.

Advantageously, the presence of the elastic means 8 makes it possible to regulate said setting pressure by simply varying the preload of the elastic means 8.

Preferably, the elastic means 8 comprise a spring and the regulation of the setting pressure of the regulator 1 is preferably carried out by means of a screw that can be accessed from the outside of the casing 9 and is suited to vary the preload of said spring.

It can be understood that the configuration just described above, in which the motorisation chamber 4 is subjected to the delivery pressure, corresponds to that of a direct action regulator.

Therefore, advantageously, the pressure regulator 1 has the same quickness of response as a direct action regulator of the known type.

Preferably, the pressure regulator 1 is also provided with a safety valve 20 that is suited to close the flow duct 2 if required by some specific conditions, for example in case of malfunction.

The pressure regulator 1 furthermore comprises a compensation chamber 6 distinct from the motorisation chamber 4 and filled with a compensation gas at a corresponding compensation pressure.

The compensation chamber 6 is partially delimited by a second movable wall 7, operatively connected to the shutter 3 so that it can transmit to the latter the pressure force present in the compensation chamber 6.

The compensation chamber 6 can be connected directly to the area 2a of the flow duct 2 upstream of the shutter 3 in such a way that the pressure inside both areas is the same.

Said direct connection is completely analogous to that used in the direct action regulators of the known type and makes it possible to compensate for the thrust of the feeding pressure of the operative gas which tends to open the shutter 3, to the advantage of regulation precision.

For this purpose, the surface area of the second movable wall 7 preferably corresponds to the area of the surface of the shutter 3 that is subjected to the feeding pressure of the operative gas, in such a way as to obtain optimal compensation.

According to the invention, said compensation chamber 6 is not used only to compensate for the thrust of the operative gas on the shutter 3 but is exploited to pilot the pressure regulator 1 so as to correct any deviations of the delivery pressure with respect to the setting pressure.

Said deviations may be due, for example, to the variability of the force exerted by the elastic means 8 on the first movable wall 5 of the motorisation chamber 4 as the position of the shutter 3, described above, varies.

In order to make the correction, the casing 9 of the pressure regulator 1 defines a compensation channel 10 that communicates with the compensation to chamber 6 at a first end and with the outside of the casing 9 at a second end 10a.

Said compensation channel 10 makes it possible to modify the compensation pressure from the outside, regulating it according to the delivery pressure of the operative gas, in such a way as to correct said deviations from the setting pressure.

In particular, the compensation pressure is regulated in such a way that when the delivery pressure tends to exceed the set pressure, the compensation pressure varies so that the shutter 3 tends to move so as to reduce the cross section of the narrowing.

In this way, if the movement of the shutter 3 produced by the action of the motorisation chamber 4 following a variation in the delivery pressure is not sufficient to bring the delivery pressure back to the setting value, the corresponding variation in the compensation pressure corrects the position of the shutter 3 and, therefore, contributes to restoring the setting pressure.

It can therefore be understood that the invention achieves the object to increase the reliability of the regulation of the pressure regulator system compared to a direct action regulator, while at the same time maintaining its quickness of response.

Preferably but not necessarily, the compensation pressure is obtained by means of a throttling valve 12, visible in FIG. 1.

The throttling valve 12 is provided with an inlet mouth 12a, which communicates with the area 2a of the flow duct 2 upstream of the shutter 3, and with an outlet mouth 12b, which communicates with the second end 10a of the compensation channel 10.

Preferably, the throttling valve 12 is located outside the pressure regulator 1, although in variant embodiments of the invention it can be incorporated in the pressure regulator 1.

The pressure regulator system 15 furthermore comprises a pilot device 14 comprising a pilot valve 13 that can be opened to an extent that can be controlled in proportion to the difference between a predefined pilot pressure and the delivery pressure of the operative gas.

In particular, the pilot valve 13 is provided with an inlet mouth 13a connected to the outlet mouth 12b of the throttling valve 12 and with an outlet mouth 13b connected to the area 2b of the flow duct 2 downstream of the shutter 3.

The pilot valve 13 is preferably controlled by a pilot chamber 18 connected to the area 2b downstream of the flow duct 2 so that it is subjected to the delivery pressure.

Said pilot chamber 18 is delimited by an elastic membrane 19 that controls the opening of the pilot valve 13.

The elasticity of the membrane 19 produces a force that counteracts the action of the pilot pressure and is preferably obtained through elastic means 22 and/or through a pressurised setting chamber 23.

The compensation gas pressure is regulated as follows. First of all, the pilot valve 13 is arranged so that its opening is proportional to the difference between the predefined pilot pressure and the delivery pressure. The portion of operative gas that flows out of the area 2a of the flow duct 2 upstream of the shutter 3 through the pilot valve 13 transits the throttling valve 12 and is subjected to a pressure reduction that is proportional to the extracted flow rate.

As the outlet mouth 12b of the throttling valve 12 communicates with the compensation chamber 6, the pressure in said compensation chamber corresponds to the pressure downstream of the throttling valve 12 itself.

It can therefore be understood that the higher the flow rate of the operative gas flowing through the pilot valve 13, i.e. the lower the delivery pressure with respect to the pilot pressure, the lower the compensation pressure.

The reduction in the compensation pressure tends to open the shutter 3, thus increasing the delivery pressure until the condition corresponding to the pilot pressure is restored.

It can therefore be understood that the pressure regulator 1 is not piloted exclusively by the pilot valve 13, as is the case in the piloted regulators of the known type.

On the contrary, the pressure regulator 1 keeps operating as a direct action regulator of the known type, while the pilot valve 13 only corrects the deviations of the regulator 1 itself.

Therefore, the invention achieves the object to ensure continuity of operation of the pressure regulator 1 even in case of stoppage of the pilot valve 13, for example due to a malfunction.

In fact, in this case, the pressure regulator 1 keeps operating regularly as a direct action regulator, except for any alteration due to the pressure of the compensation gas, which however does not affect the operation of the regulator negatively.

Still advantageously, the pressure regulator 1 can operate also in the absence of the pilot valve 13, or with the pilot valve 13 permanently closed.

In fact, in this case the pressure in the compensation chamber 6 equals the feeding pressure, as there is no flow through the throttling valve 12 and, therefore, there is no pressure reduction through the latter.

This is particularly advantageous, for example, when it is necessary to replace the pilot valve 13, as this operation does not require the exclusion of the pressure regulator 1.

In fact, it will be sufficient to interrupt the connection between the pressure regulator 1 and the pilot valve 13 through means that are not illustrated herein but are known per se, for example taps.

The pressure regulator system 15 preferably comprises a tap 24 suited to interrupt the connection between the outlet mouth 13b of the pilot valve 13 and the flow duct 2 so as to suspend the correcting action of the pilot valve 13.

Advantageously, said suspension makes it possible both to make the initial setting of the pressure regulator 1 and to rapidly exclude the pilot valve 13 in case of malfunction of the latter.

In a variant embodiment of the invention, said suspension can be achieved by means of valves, not illustrated herein but known per se, arranged in such a way as to interrupt the connection between the pressure regulator 1 and the pilot valve 13.

Concerning the throttling valve 12, this preferably comprises regulation means 21 suited to modify the cross section of the valve 12 itself.

Said regulation makes it possible to modify the pressure drop through the throttling valve 12 with the same gas flow rate through it, consequently modifying the extent of the correction made on the pressure regulator 1.

In particular, a smaller cross section of the throttling valve 12 means, the other conditions being the same, a higher pressure drop in the compensation chamber 6 and, therefore, a higher correction effect on the regulator 1, to the benefit of quickness of regulation.

Obviously, the optimal regulation of the throttling valve 12 is the regulation that ensures the best compromise between said increased quickness of regulation and the stability of operation of the regulator 1, which is clearly inversely proportional to the quickness of regulation.

It is also clear that in variant embodiments of the invention, for example when the throttling valve 12 is set in the factory at a predetermined optimal value, the throttling valve can be without said regulation means 21.

The casing 9 of the pressure regulator 1 preferably defines a extraction channel 11 that at a first end communicates with the area 2a of the flow duct 2 upstream of the shutter 3 and at the second opposite end 11a communicates with the outside of the casing 9.

Advantageously, said extraction channel 11 makes it possible to feed the throttling valve 12 with the operative gas extracted directly from the pressure regulator 1 and, in particular, in proximity to the shutter 3, to the advantage of the compactness of the system.

Preferably, the first end of the extraction channel 11 terminates downstream of the previously mentioned safety valve 20, so that when said valve 20 is closed the passage of operative gas through the extraction channel 11 and the pilot valve 13 towards the downstream branch of the flow duct 2 is prevented.

The pilot valve 13 preferably but not necessarily comprises control means, not illustrated herein but known per se, that are configured so as to allow a remote user to modify the predefined pilot pressure, so as to achieve another object of the invention.

Preferably but not necessarily, said remote control means comprise means intended to regulate the compression of said elastic means 22 and/or the pressure in said setting chamber 23 in such a way as to modify the overall force acting on the elastic membrane 19 of the pilot chamber 18.

Again with reference to the pressure regulator 1, the compensation chamber 6 is preferably interposed between the motorisation chamber 4 and the flow duct 2.

In this way, to advantage, the second end 10a of the compensation channel 10 can be arranged in proximity to the second end 11a of the extraction channel 11, thus facilitating the connection of the channels 10, 11 to the throttling valve 12.

Furthermore, the vicinity of the two above mentioned channels 10, 11 makes it possible to incorporate them in a single removable intermediate portion 9a belonging to the casing 9, which delimits, on one side, the compensation chamber 6 and, on the opposite side, the area 2a of the flow duct 2 upstream to of the shutter 3.

Advantageously, said removable intermediate portion 9a can be easily replaced with a different intermediate portion, not illustrated in the figure, identical to the preceding one, with the exception that it has, instead of the extraction and compensation channels 10, 11, a channel which is completely inside the intermediate portion itself and which directly connects the compensation chamber 6 to the flow duct 2 at the level of the area 2a upstream of the shutter 3.

The different intermediate portion just described above makes it possible to convert the pressure regulator 1 into a direct action regulator of the traditional type.

According to the explanations provided above, it can be understood that the pressure regulator described above, the method for piloting said pressure regulator and the pressure regulator system comprising said pressure regulator achieve all the set objects.

In fact, the presence of the compensation channel of the compensation chamber makes it possible to connect the latter to a pilot device in such a way as to correct any deviation in the pressure regulated by the pressure regulator, though maintaining a quickness of response analogous to that of a direct action regulator.

Furthermore, the fact that the pilot device performs a corrective action only, without affecting the main regulation mechanism of the pressure regulator, allows the latter to work as a direct action regulator even in case of malfunction of the pilot device.

Finally, the incorporation of the compensation and extraction channels in a removable intermediate portion of the pressure regulator makes it possible to modify the latter easily and transform it into a direct action pressure regulator, and vice versa.

The invention claimed is:

1. A method for piloting a pressure regulator for an operative gas, said pressure regulator comprising:
   a flow duct for said operative gas;
   a shutter arranged along said flow duct in such a way as to define a narrowing in said flow duct, said narrowing being suited to cause a pressure drop in said operative gas from a feeding pressure, present in an upstream area of said flow duct upstream of said shutter with respect to the flow direction of said operative gas, to a delivery pressure, present in a downstream area of said flow duct downstream of said shutter, said shutter being movable in such a way as to modify the cross section of said narrowing;
   a motorisation chamber placed in communication with said downstream area, at least partially delimited by a first movable wall, said first movable wall being connected to said shutter so that the increase in said delivery pressure causes a corresponding movement of said shutter that is suited to reduce said cross section of said narrowing, and vice versa;
   elastic means for counteracting the pressure force exerted by said operative gas on said first movable wall by exerting on said first movable wall a predefined force tending to move said shutter so as to increase said cross section of said narrowing;
   a compensation chamber distinct from said motorisation chamber, filled with a compensation gas and at least partially delimited by a second movable wall connected to said shutter in such a way as to be able to transfer a pressure force of said compensation gas to said shutter, the method including the operation of regulating, moment by moment, the pressure of said compensation gas according to said delivery pressure.

2. The method according to claim 1, wherein said pressure of said compensation gas is regulated so that an increase in said delivery pressure with respect to a predefined value causes a variation in the pressure force of said compensation gas exerted on said second movable wall that is suited to cause a movement of said shutter suited to reduce said cross section of said narrowing, and vice versa.

3. The method according to claim 2, wherein said regulation of the pressure of said compensation gas is achieved by means of the following operations:
   opening a pilot valve proportionately to the difference between a predefined pilot pressure and said delivery pressure;
   causing a portion of said operative gas extracted from said upstream area to flow through said pilot valve;
   subjecting said extracted portion to a throttling operation before it flows through said pilot valve, so that the pressure of said extracted portion is reduced by an amount proportional to the flow rate of said extracted portion;
   connecting said compensation chamber to said pilot valve so that the pressure in said compensation chamber corresponds to said pressure reduced through said throttling operation.

4. A system for regulating the pressure of an operative gas, wherein the system comprises:
   a casing defines a flow duct for said operative gas:
   a shutter arranged along said flow duct in such a way as to define a narrowing in said flow duct, said narrowing being suited to cause a pressure drop in said operative gas from a feeding pressure, present in an upstream area of said flow duct upstream of said shutter with respect to the flow direction of said operative gas, to a delivery pressure, present in a downstream area of said flow duct downstream of said shutter, said shutter being movable in such a way as to modify the cross section of said narrowing:
   a motorisation chamber provided with an opening suited to connect it to said downstream area, at least partially delimited by a first movable wall, said first movable wall being connected to said shutter so that the increase in said delivery pressure causes a corresponding movement of said shutter suited to reduce said cross section, and vice versa:

elastic means configured in such a way as to exert on said first movable wall a predefined force, said predefined force being directed so that it counteracts the pressure force exerted by said operative gas on said first movable wall and tending to move said shutter so as to increase said cross section of said narrowing:

a compensation chamber distinct from said motorisation chamber and at least partially delimited by a second movable wall operatively connected to said shutter in such a way as to be able to transfer the pressure force of a gas contained in said compensation chamber to said shutter, wherein said casing defines a compensation channel that communicates at a first end with said compensation chamber and at a second end with the outside of said casing;

a throttling valve provided with an inlet mouth communicating with said upstream area and with an outlet mouth communicating with said second end of said compensation channel; and a pilot valve suited to be controlled in such a way as to vary the extent of its opening in proportion to the difference between a predefined pilot pressure and said delivery pressure, said pilot valve being provided with a pilot valve inlet mouth communicating with said outlet mouth of said throttling valve and with a pilot valve outlet mouth communicating with said downstream area.

5. The system according to claim 4, further comprises regulation means for regulating the pressure drop through said throttling valve for a given gas flow rate through said throttling valve.

6. The system according to claim 4, wherein said pilot valve comprises control means for allowing a remote user to modify said predefined pilot pressure.

7. The system according to claim 4, further comprising a tap suited to interrupt said connection between said outlet mouth of said pilot valve and said flow duct.

8. The pressure regulator according to claim 4, wherein said compensation chamber is interposed between said motorisation chamber and said flow duct.

9. The pressure regulator according to claim 4, wherein said casing comprises a removable intermediate portion in which said compensation channel is defined, wherein one side of said removable intermediate portion delimits said compensation chamber and the opposite side delimits said upstream area.

10. The pressure regulator according to claim 4, wherein said casing defines an extraction channel that communicates at a first end with said upstream area and at the second opposite end with the outside of said casing.

11. The pressure regulator according to claim 4:
wherein said casing defines an extraction channel that communicates at a first end with said upstream area and at the second opposite end with the outside of said casing; and
wherein said extraction channel is defined in said removable intermediate portion.

* * * * *